US012630164B2

(12) United States Patent
Alleva et al.

(10) Patent No.: US 12,630,164 B2
(45) Date of Patent: May 19, 2026

(54) METHOD AND SYSTEM FOR DETECTING AND LOCATING OBSTACLES/ELEMENTS ON ROAD PAVEMENT THAT ARE DANGEROUS OR POTENTIALLY DANGEROUS TO TIRE AND/OR VEHICLE INTEGRITY

(71) Applicant: Bridgestone Europe NV/SA [BE/BE], Zaventem (BE)

(72) Inventors: Lorenzo Alleva, Rome (IT); Valerio Bortolotto, Rome (IT); Roberto Benedetti, Rome (IT); Marco Pascucci, Rome (IT)

(73) Assignee: Bridgestone Europe NV/SA, Zaventem (BE)

( * ) Notice: Subject to any disclaimer, the term of this patent is extended or adjusted under 35 U.S.C. 154(b) by 197 days.

(21) Appl. No.: 18/580,216

(22) PCT Filed: Jul. 15, 2022

(86) PCT No.: PCT/EP2022/069871
§ 371 (c)(1),
(2) Date: Jan. 18, 2024

(87) PCT Pub. No.: WO2023/001707
PCT Pub. Date: Jan. 26, 2023

(65) Prior Publication Data
US 2024/0308526 A1 Sep. 19, 2024

(30) Foreign Application Priority Data
Jul. 19, 2021 (IT) ........................ 102021000019016

(51) Int. Cl.
*B60W 40/06* (2012.01)
*B60W 50/14* (2020.01)
*G01C 21/00* (2006.01)

(52) U.S. Cl.
CPC ............ *B60W 40/06* (2013.01); *B60W 50/14* (2013.01); *G01C 21/3822* (2020.08);
(Continued)

(58) Field of Classification Search
CPC ...................................................... B60W 40/06
See application file for complete search history.

(56) References Cited

U.S. PATENT DOCUMENTS

2016/0201277 A1* 7/2016 Svantesson ............. E01C 23/01
73/146
2019/0329786 A1* 10/2019 Kimura ............... B60W 40/072
(Continued)

FOREIGN PATENT DOCUMENTS

JP       2020013537 A      1/2020
WO      2019229627 A1     12/2019
(Continued)

*Primary Examiner* — Imran K Mustafa
(74) *Attorney, Agent, or Firm* — Patterson Intellectual Property Law, PC

(57) ABSTRACT

A method is provided for detecting and locating obstacles/elements on road pavement, including: acquiring driven wheel speed values, and georeferencing data indicative of corresponding motor vehicle positions; detecting obstacles/elements present on the road based on the wheel speed values by identifying entry time instants at which the wheel meets the obstacles/elements, and exit time instants at which the wheel has gone beyond said obstacles/elements, and by computing normalized peak-to-peak values related to the obstacles/elements based on maximum and minimum wheel speed values related to impact-related time instants comprised between the entry and exit time instants, and an average value of the wheel speed values related to first impact-free time instants immediately before the entry time instants; determining a severity degree for each respective obstacle/element based on the normalized peak-to-peak value; determining and storing a position of the obstacle/
(Continued)

element based on the georeferencing data, along with the severity degree associated therewith.

19 Claims, 5 Drawing Sheets

(52) U.S. Cl.
CPC ..... *G01C 21/3833* (2020.08); *B60W 2520/06* (2013.01); *B60W 2520/28* (2013.01)

(56) References Cited

U.S. PATENT DOCUMENTS

| 2020/0238999 | A1  |   | 7/2020  | Batts et al. | |
| 2022/0381581 | A1  | * | 12/2022 | Kim ..................... | B60W 40/06 |

FOREIGN PATENT DOCUMENTS

| WO | 2019229628 | A1 | 12/2019 |
| WO | 2019229629 | A1 | 12/2019 |
| WO | 2019229630 | A1 | 12/2019 |
| WO | 2019229634 | A1 | 12/2019 |

* cited by examiner

METHOD AND SYSTEM FOR DETECTING AND LOCATING OBSTACLES/ELEMENTS ON ROAD PAVEMENT THAT ARE DANGEROUS OR POTENTIALLY DANGEROUS TO TIRE AND/OR VEHICLE INTEGRITY

TECHNICAL FIELD OF THE INVENTION

The present invention concerns a method and a system for detecting and locating obstacles/elements on road pavement that are dangerous or potentially dangerous to tire and/or vehicle integrity (e.g., potholes, bumps, or the like), for determining severity degrees/levels of the detected obstacles/elements and, preferably, also for determining one or more geometrical features of the detected obstacles/elements.

STATE OF THE ART

As is known, road pavements need to be designed so as to ensure a rolling surface that is substantially regular and with little deformation in order to meet safety and comfort requirements for motor vehicles driven thereon.

In fact, an impact of a wheel of a motor vehicle against/on an obstacle on the road pavement (such as a pothole, a bump or the like) can cause a damage to the tire of the wheel, in particular to the carcass (i.e., the casing) thereof, and/or to the motor vehicle (e.g., to the wheel rim and/or the suspension).

For example, an external bulge on the sidewall of a tire typically indicates that cords have been broken inside the carcass due to an impact against/on an obstacle, since driving on objects like bumps and potholes can cause individual cords to break.

If a damaged tire (e.g., a tire with some damaged cords) is not promptly detected and, hence, is not promptly repaired/replaced, by keeping on driving with said damaged tire there is a risk of completely breaking/destroying the carcass of the tire and even of damaging the wheel rim and/or the suspension (for example, in case of further impacts of the damaged tire against/on other obstacles).

Therefore, in the automotive sector, there is markedly felt the need for tire damage detection technologies capable of automatically and promptly detecting potential damages to tires of motor vehicles.

For example, known solutions of this kind are disclosed in Applicant's International applications WO 2019/229627 A1, WO 2019/229628 A1, WO 2019/229629 A1, WO 2019/229630 A1 and WO 2019/229634 A1.

In particular, WO 2019/229627 A1 concerns a tire damage detection system including an acquisition device, a processing system and a notification device. The acquisition device is installed on board a motor vehicle equipped with two or more wheels fitted with tires, is coupled to a vehicle bus of the motor vehicle, and is configured to acquire, from the vehicle bus, signals indicative of speeds of the motor vehicle and of a wheel of said motor vehicle, and to output quantities indicative of the speeds of the motor vehicle and of the wheel thereof. The processing system is configured to store a predefined tire damage model and to receive, from the acquisition device, the quantities indicative of the speeds of the motor vehicle and of the wheel of said motor vehicle, and is programmed to compute, based on the quantities indicative of the speeds of the motor vehicle and of the wheel of said motor vehicle, a normalized wheel speed indicative of a ratio of the wheel speed to the motor vehicle speed, and to detect a potential damage to a tire of the wheel of the motor vehicle based on the predefined tire damage model and on the normalized wheel speed. The notification device is configured to, if a potential damage to the tire of the wheel of the motor vehicle is detected by the processing system, signal the detected potential damage to a user associated with the motor vehicle. In the tire damage detection system according to WO 2019/229627 A1, the processing system is a cloud computing system that is wirelessly and remotely connected to the acquisition device, while the notification device is an electronic communication device associated with the user and remotely connected to the cloud computing system via one or more wired and/or wireless networks.

Instead, WO 2019/229628 A1 concerns a tire damage detection method that includes a tire damage detection step comprising: providing an acquisition device, which is installed on board a motor vehicle equipped with two or more wheels fitted with tires, and which is coupled to a vehicle bus of the motor vehicle, and a processing device/system storing a predefined tire damage model; acquiring, by the acquisition device from the vehicle bus, signals indicative of speeds of the motor vehicle and of a wheel of said motor vehicle; outputting, by the acquisition device, quantities indicative of the speeds of the motor vehicle and of the wheel thereof; receiving, by the processing device/system from the acquisition device, the quantities indicative of the speeds of the motor vehicle and of the wheel of said motor vehicle; computing, by the processing device/system, based on the quantities indicative of the speeds of the motor vehicle and of the wheel of said motor vehicle, a normalized wheel speed indicative of a ratio of the wheel speed to the motor vehicle speed; and detecting, by the processing device/system, a potential damage to a tire of the wheel of the motor vehicle based on the predefined tire damage model and on the normalized wheel speed. The tire damage detection method according to WO 2019/229628 A1 includes also a preliminary step that comprises: performing tests involving test tire impacts against/on different obstacles at different motor vehicle speeds; measuring/acquiring test-related wheel and motor vehicle speeds during the performed tests; computing test-related normalized wheel speeds based on the test-related wheel and motor vehicle speeds; and determining the predefined tire damage model to be used by the processing device/system in the tire damage detection step on the basis of the test-related normalized wheel speeds and the test-related motor vehicle speeds that correspond to the test tire impacts.

Additionally, WO 2019/229629 A1 concerns a tire damage detection system that includes an acquisition device, a processing system and a notification device. The acquisition device is installed on board a motor vehicle equipped with two or more wheels fitted with tires, is coupled to a vehicle bus of the motor vehicle, and is configured to acquire, from the vehicle bus, a signal indicative of a speed of a wheel of the motor vehicle and to output quantities indicative of the wheel speed. The processing system is configured to store a predefined tire damage model and to receive, from the acquisition device, the quantities indicative of the wheel speed, and is programmed to compute, based on the quantities indicative of the wheel speed, a normalized wheel speed indicative of a ratio of the wheel speed to an average wheel speed indicative of motor vehicle speed, and to detect a potential damage to a tire of the wheel of the motor vehicle based on the predefined tire damage model and on the normalized wheel speed. The notification device is configured to, if a potential damage to the tire of the wheel of the motor vehicle is detected by the processing system, signal the detected potential damage to a user associated with the motor vehicle. In the tire damage detection system according to WO 2019/229629 A1, the processing system is a cloud computing system that is wirelessly and remotely connected to the acquisition device, while the notification device is an electronic communication device associated with the user and remotely connected to the cloud computing system via one or more wired and/or wireless networks.

Moreover, WO 2019/229630 A1 concerns a tire damage detection method that includes a tire damage detection step comprising: providing an acquisition device, which is installed on board a motor vehicle equipped with two or more wheels fitted with tires, and which is coupled to a vehicle bus of the motor vehicle, and a processing device/system storing a predefined tire damage model; acquiring, by the acquisition device from the vehicle bus, a signal indicative of a speed of a wheel of the motor vehicle; outputting, by the acquisition device, quantities indicative of the wheel speed; receiving, by the processing device/system from the acquisition device, the quantities indicative of the wheel speed; computing, by the processing device/system, based on the quantities indicative of the wheel speed, a normalized wheel speed indicative of a ratio of the wheel speed to an average wheel speed indicative of motor vehicle speed; and detecting, by the processing device/system, a potential damage to a tire of the wheel of the motor vehicle based on the predefined tire damage model and on the normalized wheel speed. The tire damage detection method according to WO 2019/229630 A1 includes also a preliminary step that comprises: performing tests involving test tire impacts against/on different obstacles at different motor vehicle speeds; measuring/acquiring test-related wheel speeds during the performed tests; computing test-related normalized wheel speeds based on the test-related wheel speeds; and determining the predefined tire damage model to be used by the processing device/system in the tire damage detection step on the basis of the test-related normalized wheel speeds corresponding to the test tire impacts and of associated test-related average wheel speeds.

Furthermore, WO 2019/229634 A1 concerns a tire damage detection system that includes an acquisition device and a processing device/system. The acquisition device is installed on board a motor vehicle equipped with two or more wheels fitted with tires, is coupled to a vehicle bus of the motor vehicle, and is configured to acquire, from the vehicle bus, a signal indicative of a speed of a wheel of the motor vehicle and to output quantities indicative of the wheel speed. The processing device/system is configured to store a predefined tire damage model that includes a set of predefined thresholds related to different reference wheel speed values and a set of predefined time lengths related to different reference wheel speed values and to receive, from the acquisition device, the quantities indicative of the wheel speed, and is programmed to: analyse the wheel speed by means of a sliding time window; select one of the predefined thresholds and one of the predefined time lengths based on a given reference wheel speed value that is a wheel speed value, or an average of wheel speed values, immediately preceding and/or following the sliding time window, wherein said sliding time window has the predefined time length selected; detect a maximum value and a minimum value of the wheel speed within the sliding time window; compute a difference between said maximum and minimum values; compute a ratio of the difference between said maximum and minimum values to the given reference wheel speed value; and detect a potential damage to a tire of the wheel of the motor vehicle if the ratio of the difference between said maximum and minimum values to the given reference wheel speed value exceeds the predefined threshold selected.

OBJECT AND SUMMARY OF THE INVENTION

In view of the foregoing, the Applicant has felt the need to carry out an in-depth study in order to try developing an innovative technical solution for detecting and locating obstacles/elements on road pavement that are dangerous or potentially dangerous to tire and/or vehicle integrity (e.g., potholes, bumps, or the like), for determining severity degrees/levels of the detected obstacles/elements and, preferably, also for determining one or more geometrical features thereof, thereby enabling also signalling of positions of detected hazardous obstacles/elements to drivers (in order to allow them to avoid, or to tackle with an appropriately reduced speed, said hazardous obstacles/elements) and/or to road managing companies (for example, in order to appropriately plan and/or prioritize road maintenance works). In this way, the Applicant has arrived at the present invention.

Therefore, an object of the present invention is that of providing a technical solution for detecting and locating obstacles/elements on road pavement that are dangerous or potentially dangerous to tire and/or vehicle integrity, for determining severity degrees/levels of the detected obstacles/elements and, preferably, also for determining one or more geometrical features thereof.

This and other objects are achieved by the present invention in that it relates to a method and a system for detecting and locating obstacles/elements on road pavement, as defined in the appended claims.

In particular, the present invention concerns a method for detecting and locating obstacles/elements on road pavement, wherein said method includes:

acquiring
- wheel speed values related to a wheel of a motor vehicle driven on a road, and
- georeferencing data associated with the wheel speed values and indicative of corresponding positions of the motor vehicle;

detecting an obstacle/element present on the road based on the acquired wheel speed values by
- identifying an entry time instant at which the wheel meets the obstacle/element, and an exit time instant at which the wheel has gone beyond said obstacle/element, and
- computing a normalized peak-to-peak value related to the obstacle/element based on
  - a maximum value and a minimum value of the acquired wheel speed values related to impact-related time instants comprised between the entry and exit time instants, and
  - an average value of the acquired wheel speed values related to first impact-free time instants immediately before the entry time instant;

determining a severity degree associated with the obstacle/element based on the normalized peak-to-peak value;

determining a position of the obstacle/element based on the acquired georeferencing data associated with one or more of the acquired wheel speed values related to the impact-related time instants and/or to the first impact-free time instants and/or to second impact-free time instants immediately after the exit time instant; and

storing the position of the obstacle/element along with the severity degree associated therewith.

BRIEF DESCRIPTION OF THE DRAWINGS

For a better understanding of the present invention, preferred embodiments, which are intended purely by way of non-limiting examples, will now be described with reference to the attached drawings (all not to scale), where.

DETAILED DESCRIPTION OF PREFERRED EMBODIMENTS OF THE INVENTION

The following discussion is presented to enable a person skilled in the art to make and use the invention. Various modifications to the embodiments will be readily apparent to those skilled in the art, without departing from the scope of the present invention as claimed. Thence, the present invention is not intended to be limited to the embodiments shown and described, but is to be accorded the widest scope of protection consistent with the features defined in the appended claims.

The present invention concerns a method for detecting and locating obstacles/elements on road pavement that are dangerous or potentially dangerous to tire and/or vehicle integrity (e.g., potholes, bumps, or the like), for determining severity degrees/levels of the detected obstacles/elements and, preferably, also for determining one or more geometrical features thereof.

Figure 1:
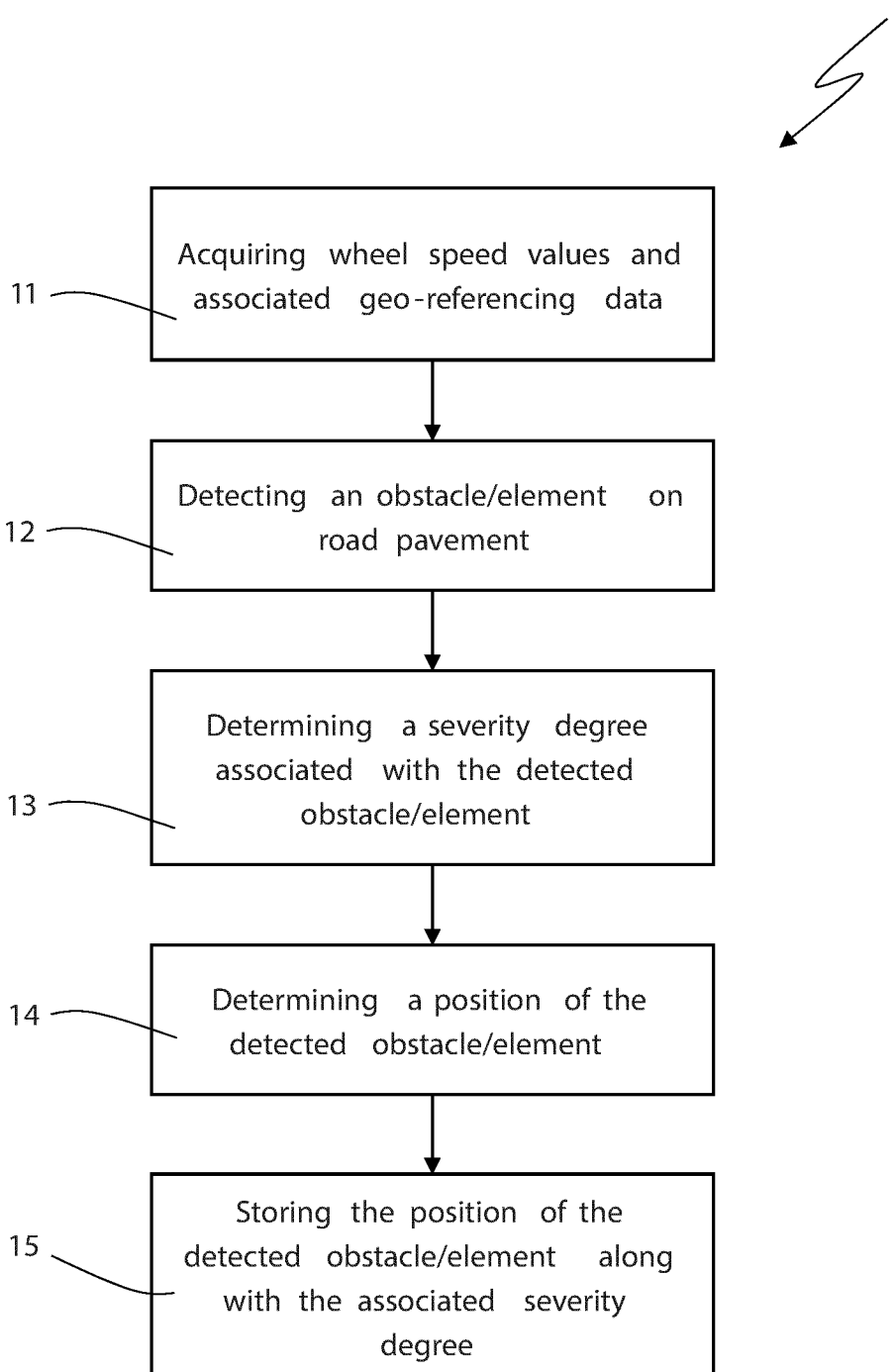
FIG. 1 schematically illustrates a hazardous obstacle/element detection and localization method according to a preferred embodiment of the present invention.

In this respect, FIG. 1 schematically illustrates a hazardous obstacle/element detection and localization method (denoted as a whole by 1) according to a preferred embodiment of the present invention.

In particular, the hazardous obstacle/element detection and localization method 1 includes:

acquiring (block 11 in FIG. 1)

wheel speed values related to a wheel of a motor vehicle driven on a road (conveniently, a motor vehicle fitted with two or more wheels, such as a two-or three-wheeled motorbike, a car, a bus, a truck, etc., equipped with an internal combustion engine, or of the hybrid or electric type), and georeferencing data associated with the wheel speed values and indicative of corresponding positions of the motor vehicle (e.g., positions provided by a Global Navigation Satellite System (GNSS) receiver, such as a Global Positioning System (GPS) receiver, installed on board said motor vehicle);

detecting (block 12 in FIG. 1) an obstacle/element present on the road based on the acquired wheel speed values by identifying an entry time instant at which the wheel meets the obstacle/element, and an exit time instant at which the wheel has at gone beyond said obstacle/element, and computing a normalized peak-to-peak value related to the obstacle/element based on a maximum value and a minimum value of the acquired wheel speed values related to impact-related time instants comprised between the entry and exit time instants, and an average value of the acquired wheel speed values related to first impact-free time instants immediately before the entry time instant, wherein the normalized peak-to-peak value is conveniently computed as a ratio of a peak-to-peak value of the wheel speed (i.e., a difference between the maximum and minimum values thereof) due to impact against/on the obstacle/element to the average value of the wheel speed before the impact (wherein said average value is indicative of a speed of the motor vehicle when impacting said obstacle/element), whereby said ratio represents impact-related peak-to-peak wheel speed normalized with respect to impact vehicle speed;

determining (block 13 in FIG. 1) a severity degree associated with the detected obstacle/element (i.e., a degree/level of danger or potential danger thereof to integrity of a tire of the wheel) based on the normalized peak-to-peak value;

determining (block 14 in FIG. 1) a position of the detected obstacle/element based on the acquired georeferencing data associated with one or more of the acquired wheel speed values related to the impact-related time instants (i.e., those ones comprised between the entry and exit time instants) and/or to the first impact-free time instants (i.e., those ones immediately before the entry time instant) and/or to second impact-free time instants immediately after the exit time instant; and storing (block 15 in FIG. 1)—for example, on a memory or a database—the determined position of the detected obstacle/element along with the determined severity degree associated therewith.

Conveniently, the entry and exit time instants are identified by analyzing the acquired wheel speed values by means of a sliding time window having a predefined time length. Preferably, said predefined time length is selected from among predefined window time length values (for example, stored predefined window time length values) on the basis of a current vehicle speed value indicative of a current speed (conveniently, an average current speed) of the motor vehicle, wherein said current vehicle speed value can be conveniently computed based on one or more of the acquired wheel speed values.

Conveniently, computing a normalized peak-to-peak value related to the obstacle/element comprises:

forming an impact-related speed vector with the acquired wheel speed values related to the impact-related time instants (i.e., those ones comprised between the entry and exit time instants), and an impact-free speed vector with the acquired wheel speed values related to the first impact-free time instants (i.e., those ones immediately before the entry time instant); and computing the normalized peak-to-peak value based on a maximum value and a minimum value of the wheel speed values in the impact-related speed vector, and an average value of the wheel speed values in the impact-free speed vector (wherein, as previously explained, said average value is indicative of a speed of the motor vehicle when impacting said obstacle/element).

Preferably, the severity degree associated with the detected obstacle/element is determined (block 13 in FIG. 1) based on the computed normalized peak-to-peak value and on an impact vehicle speed value indicative of a speed, conveniently an average speed, of the motor vehicle when impacting said obstacle/element.

In particular, the impact vehicle speed value can be conveniently obtained:

by acquiring the wheel speed values (block 11 in FIG. 1) along with corresponding vehicle speed values of the motor vehicle and by computing said impact vehicle speed value based on one or more of the acquired vehicle speed values related to the first impact-free time instants (i.e., those ones immediately before the entry time instant); or by computing said impact vehicle speed value based on one or more of the acquired wheel speed values related to the first impact-free time instants, conveniently one or more of the wheel speed values in the impact-free speed vector.

Conveniently, acquiring the wheel speed values (block 11 in FIG. 1) comprises acquiring wheel speed values related to all the wheels of the motor vehicle, wherein the hazardous obstacle/element detection and localization method 1 further includes determining a travelling direction of the motor vehicle based on the acquired georeferencing data associated with one or more of the acquired wheel speed values related to the first impact-free time instants and to the second impact-free time instants, and wherein the position of the detected obstacle/element is determined (block 14 in FIG. 1) based on:

a vehicle position determined based on the acquired georeferencing data associated with one or more of the acquired wheel speed values related to the impact-related time instants;

a position on the motor vehicle of the wheel that has impacted the detected obstacle/element (e.g., front/rear right/left wheel); and the determined travelling direction of the motor vehicle (whereby the position of the detected obstacle/element is determined with increased accuracy, identifying also the correct road lane where the detected obstacle/element is located).

Preferably, the hazardous obstacle/element detection and localization method 1 further includes estimating a first geometrical feature of the obstacle/element (conveniently, a length thereof in the travelling direction of the motor vehicle) based on:

a time difference between the identified entry and exit time instants; and the average value of the acquired wheel speed values related to the impact-free time instants (conveniently, the average value of the wheel speed values in the impact-free speed vector), or the impact vehicle speed value.

Moreover, the hazardous obstacle/element detection and localization method 1 preferably includes estimating also a second geometrical feature of the obstacle/element (conveniently, a height/depth thereof) based on the normalized peak-to-peak value, the impact vehicle speed value and predefined reference data/thresholds, wherein said predefined reference data/thresholds can be preliminarily obtained by:

performing impact tests involving driving one or more motor vehicles at different vehicle speeds against/on different obstacles/elements with known, different geometrical features (e.g., potholes, bumps, or the like, having known, different depths/heights and/or lengths);

measuring/acquiring test-related wheel speeds (and, conveniently, also test-related vehicle speeds) during the performed impact tests; and computing/determining, based on the test-related wheel speeds (and, conveniently, also on the test-related vehicle speeds), reference data/thresholds to be subsequently used to estimate the second geometrical feature of the detected obstacle/element.

Preferably, the severity degree associated with the detected obstacle/element is determined (block 13 in FIG. 1) also on the basis of said predefined reference data/thresholds (conveniently determined by preliminary carrying out the aforesaid impact tests).

Preferably, the hazardous obstacle/element detection and localization method 1 further includes:

warning a driver approaching the obstacle/element about presence thereof (thereby allowing the driver to avoid, or to tackle with an appropriately reduced speed, said obstacle/element); and/or signalling the determined position of the obstacle/element along with the determined severity degree associated therewith (and, conveniently, also the estimated first and/or second geometrical feature(s) thereof) to a road managing company in charge of the road (for example, thereby allowing said road managing company to appropriately plan and/or prioritize road maintenance works).

The hazardous obstacle/element detection and localization method 1 can be advantageously carried out by acquiring (block 11 in FIG. 1) the wheel speed values related to the wheels of, and the georeferencing data (and, conveniently, also the vehicle speed values) of, a plurality of motor vehicles of a single type or of multiple/different types (e.g., two- or three-wheeled motorbikes and/or cars and/or buses and/or trucks, etc., fitted with internal combustion engines or of the hybrid or electric type).

In view of the foregoing, the hazardous obstacle/element detection and localization method 1 enables assessment of road conditions by detecting and locating hazardous obstacles/elements (such as potholes, bumps or the like) present on road pavements and, conveniently, also by estimating their geometry based on wheel speed analysis.

In particular, the hazardous obstacle/element detection and localization method 1 conveniently provides information, such as geometry and positions on a map, about road hazardous obstacles/elements and, hence, allows warning in advance drivers to avoid potential impacts against said road hazardous obstacles/elements (for example, by signalling in advance the presence of road hazardous obstacles/elements and by suggesting appropriately reduced speeds such that to prevent damages to tires, wheel rims, suspensions, etc.).

Moreover, by exploiting the hazardous obstacle/element detection and localization method 1, also road managing companies can be conveniently informed about road hazardous obstacles/elements, thereby enabling proper planning of road maintenance works. Additionally, the information obtained thanks to the hazardous obstacle/element detection and localization method 1 can be also used for assessment of vehicle components such as tires, suspensions, steering systems, and chassis.

As previously described, the detection of an obstacle/ element on road pavement (block 12 in FIG. 1) requires a correct identification of entry and exit time instants related to an impact on/against said obstacle/element and, hence, a correct identification of the wheel speed values related to time instants before the impact on/against said obstacle/ element (when speed is almost constant) and of the wheel speed values related to time instants during the impact (when speed typically assumes a minimum value and then a maximum value or vice versa depending on obstacle/ele- ment type, e.g., a bump or a pothole).

Conveniently, in order to correctly identify a pre-impact time window and a post-impact time window to be used for successive analysis/processing, the following mathematical formula can be advantageously used to identify a time instant when the wheel touches an exit edge of an obstacle/ element such as a pothole:

$$\sum\nolimits_{i=1}^{N} |v_i - \bar{v}| \le K,$$

where $v_i$ denotes the i-th wheel speed value in a time window having a predefined time length of N wheel speed samples, $\bar{v}$ denotes an average wheel speed of the N wheel speed samples in said time window, and K denotes a predefined constant threshold.

Figure 2:
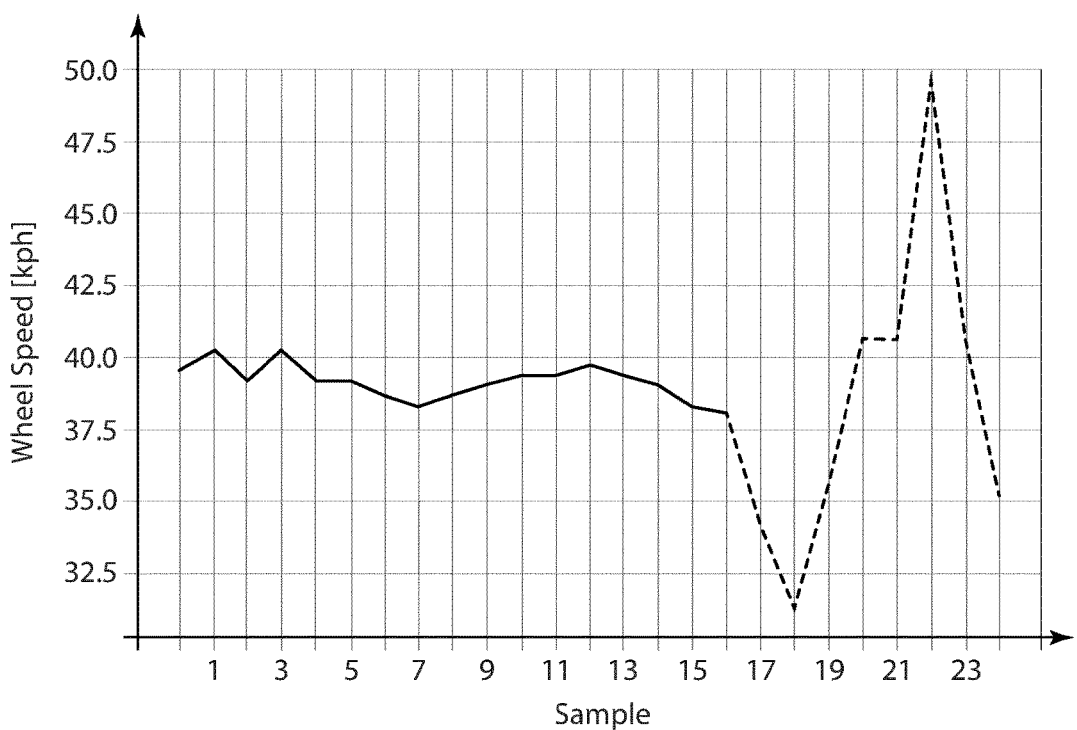
FIGS. 2 and 3 show examples of wheel speed behavior over time for impacts of a wheel of a motor vehicle on a pothole.
Figure 3:
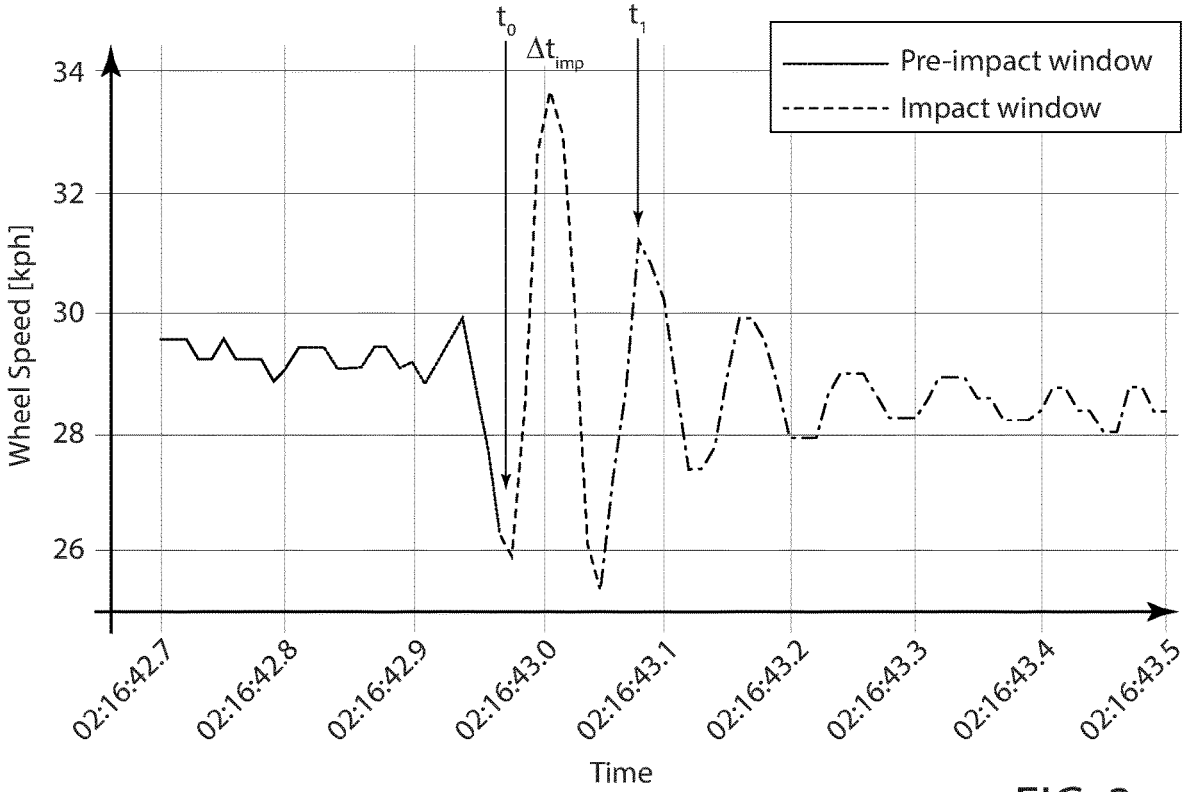

In this respect, reference can be made to FIGS. 2 and 3 that show examples of wheel speed behavior over time for impacts of a wheel of a motor vehicle on a pothole. In particular, with specific reference to FIG. 3, by analyzing the waveform resulting from the impact on the pothole, it is possible to identify the entry time instant to and the exit time instant $t_1$. Additionally, by multiplying the time difference $\Delta t_{imp}=t_1-t_0$ by the impact vehicle speed value, it is possible to obtain an estimated length of the pothole.

Once identified the entry and exit time instants related to an obstacle/element hit by a wheel of a motor vehicle, a corresponding normalized peak-to-peak value $P_2P$ can be conveniently computed according to the following mathematical formula:

$$P_2P = \frac{\max(V_t) - \min(V_t)}{avg(V_p)},$$

where $V_t$ denotes the aforesaid impact-related speed vector including the wheel speed values related to time instants comprised between the entry time instant $t_0$ and the exit time instant $t_1$ (i.e., during the transitory period of the impact), and $V_p$ denotes the aforesaid impact-free speed vector including the wheel speed values related to time instants immediately before the impact (i.e., immediately before the entry time instant $t_0$).

Then, a severity degree associated with the hit obstacle/ element can be determined (block 13 in FIG. 1) based on the computed normalized peak-to-peak value $P_2P$. In this respect, reference can be made to FIG. 4 that shows an example of different severity degrees For impacts of a wheel of a motor vehicle on/against obstacles/elements on road pavement.

Additionally, as previously described, preliminary impact tests can be conveniently performed. In this way, it is possible to assess an exponential behaviour of the relative peak-to-peak wheel speed signal with respect to vehicle speed signal over different obstacles/elements with different heights/depths and lengths. In this respect, reference can be made to FIG. 5 that shows examples of results of impact tests performed by the Applicant by driving motor vehicles at different speeds against a first bump with a first height of 1 cm (continuous line), a second bump with a second height of 3 cm (dash-dot line), a third bump with a third height of 8 cm (dashed line).

As previously explained, the severity degree determined for an obstacle/element (block 13 in FIG. 1) is indicative of the danger or potential danger of said obstacle/element to tire integrity. In particular, the severity degree Can be conveniently computed by rescaling the normalized peak- to-peak response $P_2P$ of the motor vehicle(s) used for the impact tests in the following way:

| | |
|---|---|
| Severity = 1 (very mild) | $P_2P$ <50% Exp; |
| Severity = 2 (mild) | $P_2P$ >60% Exp; |
| Severity = 3 (relevant) | $P_2P$ >80% Exp; |
| Severity = 4 (severe) | $P_2P$ >100% Exp. |

Figures 5, 6:
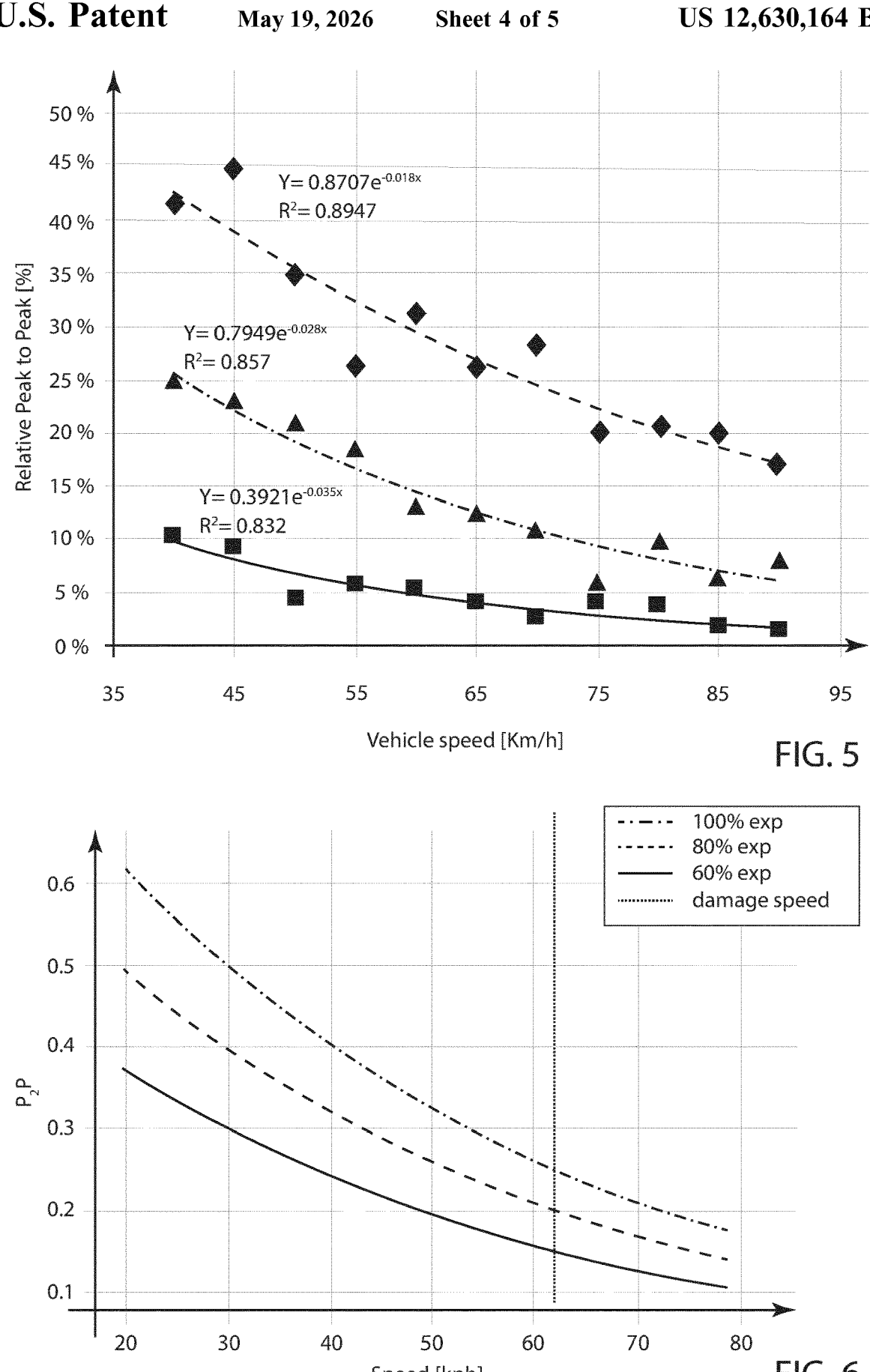
FIG. 5 shows examples of results of impact tests performed by the Applicant by driving motor vehicles at different speeds against bumps with different heights.
FIG. 6 shows an example of chart related to different integrity degrees.

In this respect, reference can be made to FIG. 6 that shows an example of $P_2P$-vs-speed chart related to different integrity degrees.

Therefore, reference thresholds can be conveniently tuned by performing additional impact tests with additional, different bump/pothole geometries and shapes.

Figure 7:
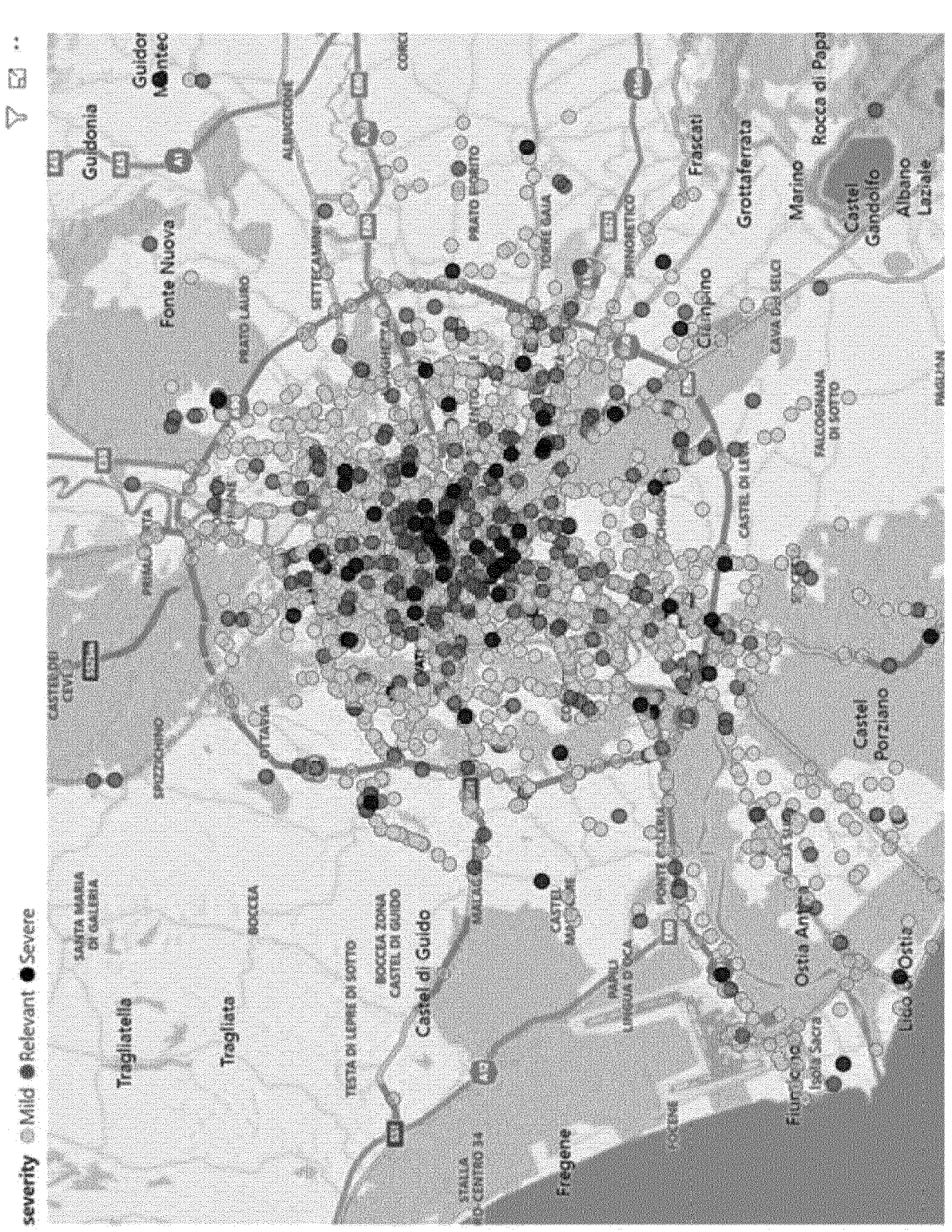
FIG. 7 shows an example of a map relating to Rome area in Italy, wherein detected hazardous obstacles/elements are shown along with respective severity degrees associated therewith.

FIG. 7 shows an example of a map relating to Rome area in Italy, wherein detected hazardous obstacles/elements are shown along with respective severity degrees associated therewith.

The present invention concerns also a system designed to:
detect and locate obstacles/elements on road pavement that are dangerous or potentially dangerous to tire and/or vehicle integrity (e.g., potholes, bumps, or the like);
determine severity degrees/levels of the detected obstacles/elements; and,
preferably, also determine one or more geometrical features of the detected obstacles/elements.

Figures 4, 8:
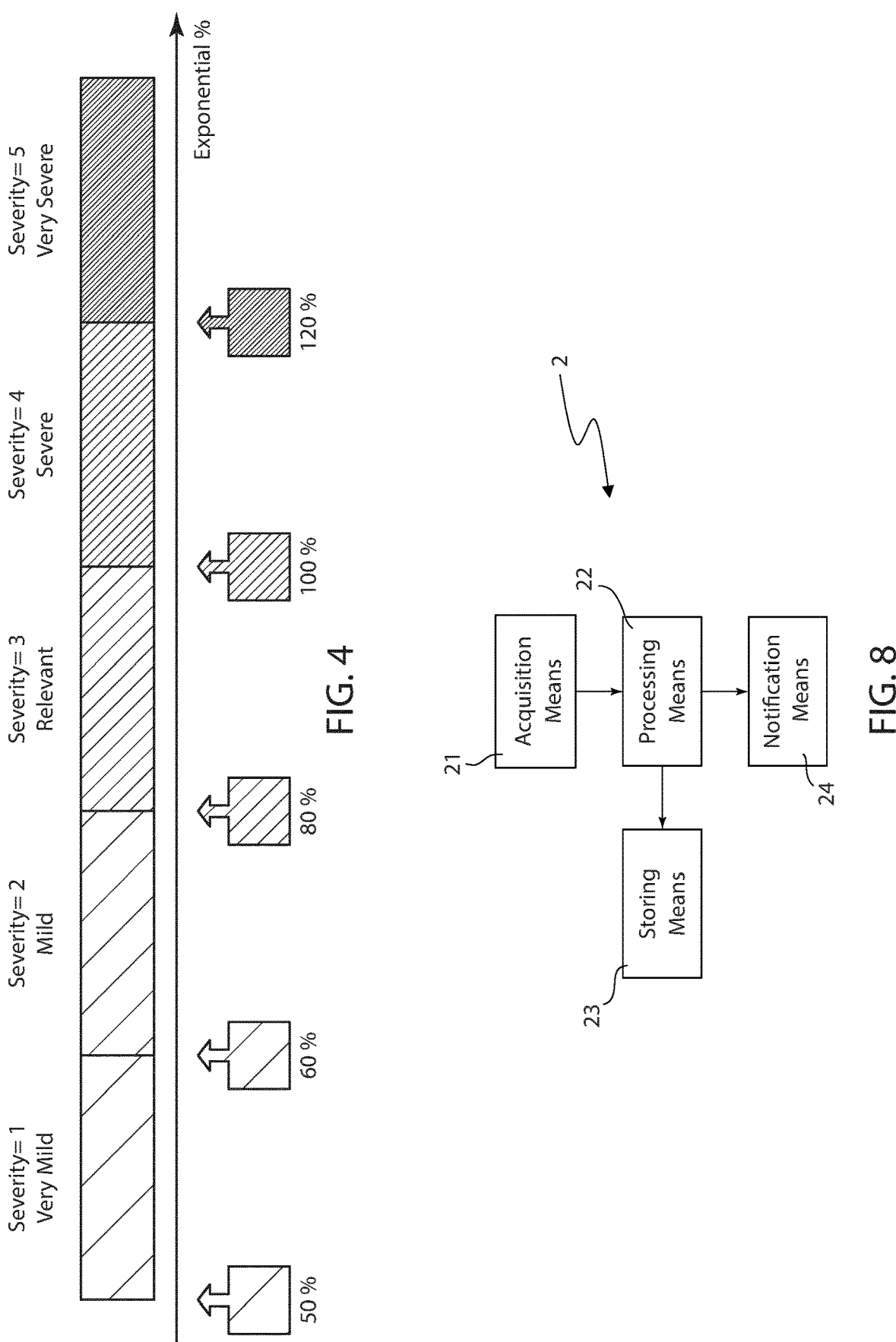
FIG. 4 shows an example of different severity degrees for impacts of a wheel of a motor vehicle on/against obstacles/elements on road pavement.
FIG. 8 schematically illustrates a hazardous obstacle/element detection and localization system according to a general embodiment of the present invention, which is designed to carry out the hazardous obstacle/element detection and localization method shown in FIG. 1.

In this respect, FIG. 8 schematically illustrates, by means of a block diagram, a functional architecture of a hazardous obstacle/element detection and localization system (denoted as a whole by 2) according to a general embodiment of the present invention, which is designed to carry out the hazardous obstacle/element detection and localization method 1.

In particular, the hazardous obstacle/element detection and localization system 2 includes acquisition means 21, processing means 22, storing means 23 and notification means 24.

The acquisition means 21 are configured to carry out the wheel speed value and georeferencing data acquisition step (block 11 in FIG. 1) of the hazardous obstacle/element detection and localization method 1.

Conveniently, the acquisition means 21 include an acquisition device that is installed on board the motor vehicle and is coupled to a vehicle bus thereof (e.g., based upon a standard Controller Area Network (CAN) bus) to acquire, from said vehicle bus, the wheel speed values and the georeferencing data (and, conveniently, also the vehicle speed values).

More in general, the acquisition means 21 preferably include a plurality of acquisition devices, each of which is installed on board a respective motor vehicle and is coupled to a respective vehicle bus of said respective motor vehicle to acquire, from said respective vehicle bus, respective wheel speed values and respective georeferencing data (and, conveniently, also respective vehicle speed values).

The processing means 22 are configured to:

receive from the acquisition means 21 the acquired wheel speed values (and, and georeferencing data conveniently, also the acquired vehicle speed values);

carry out the obstacle/element detection step (block 12 in FIG. 1), the severity degree determination step (block 13 in FIG. 1) and the position determination step (block 14 in FIG. 1) of the hazardous obstacle/element detection and localization method 1; and, conveniently, carry out also the previously described step(s) of estimating the first and/or second geometrical feature(s) of the detected obstacles/elements.

The processing means 22 can be conveniently implemented according to:

a distributed architecture, wherein a processing device (e.g., an Electronic Control Unit (ECU) of the automotive type) is installed on board the motor vehicle and is connected to the acquisition device also installed on said motor vehicle to receive therefrom the acquired wheel speed values and georeferencing data (and, conveniently, also the vehicle speed values), or, more in general, each of a plurality of processing devices is installed on board a respective motor vehicle and is connected to the respective acquisition device also installed on said respective motor vehicle to receive therefrom the respective wheel speed values and georeferencing data (and, conveniently, also the respective vehicle speed values) acquired by said respective acquisition device; or a centralized architecture, wherein a cloud computing system is used, which is wirelessly and remotely connected to the acquisition device(s) (e.g., via one or more mobile communications technologies, such as 2G, 3G, 4G and/or 5G cellular telephony technologies) to receive the (respective) wheel speed values and the (respective) georeferencing data (and, conveniently, also the (respective) vehicle speed values) acquired by said acquisition device(s).

The storing means 23 are configured to carry out the step of storing (block 15 in FIG. 1) the positions of the detected obstacles/elements and the associated severity degrees (and conveniently, also the estimated geometrical features of the detected obstacles/elements) determined by the processing means 22.

The storing means 23 can be conveniently implemented:

in said distributed architecture, by means of a data memory installed on board the motor vehicle and coupled to the processing device also installed on said motor vehicle, or, more in general, a respective data memory locally coupled to each processing device; or in said centralized architecture, by means of a database coupled to the cloud computing system.

The notification means 24 are configured to carry out the step (s) of warning drivers and/or road managing companies about detected obstacles/elements.

The notification means 24 can be conveniently implemented by means of:

one or more software applications installed on electronic devices used by the drivers and/or on processing systems of the road managing companies; and/or Human-Machine Interface (HMI) means provided on board the motor vehicles used by the drivers.

From the foregoing, the technical advantages and the innovative features of the present invention are immediately clear to those skilled in the art.

In particular, it is important to point out again that the present invention enables detection, localization and severity characterization (and, conveniently, also geometrical characterization) of obstacles/elements on road pavement that are dangerous or potentially dangerous to tire and/or vehicle integrity, such as potholes, bumps, or the like.

Additionally, the present invention enables also signalling of positions of detected hazardous obstacles/elements to drivers (in order to allow them to avoid, or to tackle with an appropriately reduced speed, said hazardous obstacles/elements) and/or to road managing companies (for example, in order to appropriately plan and/or prioritize road maintenance works).

In conclusion, it is clear that numerous modifications and variants can be made to the present invention, which fall within the scope of the invention as defined in the appended claims.

The invention claimed is:

1. A method for detecting and locating obstacles/elements on road pavement, the method comprising:

acquiring wheel speed values related to a wheel of a motor vehicle driven on a road, and georeferencing data associated with the wheel speed values and indicative of corresponding positions of the motor vehicle;

detecting an obstacle/element present on the road based on the acquired wheel speed values by:

identifying an entry time instant at which the wheel meets the obstacle/element, and an exit time instant at which the wheel has gone beyond said obstacle/element, and computing a normalized peak-to-peak value related to the obstacle/element based on:

a maximum value and a minimum value of the acquired wheel speed values related to impact-related time instants comprised between the entry and exit time instants; and an average value of the acquired wheel speed values related to first impact- free time instants immediately before the entry time instant;

determining a severity degree associated with the obstacle/element based on the normalized peak-to-peak value;

determining a position of the obstacle/element based on the acquired georeferencing data associated with one or more of the acquired wheel speed values related to the impact-related time instants and/or to the first impact-free time instants and/or to second impact-free time instants immediately after the exit time instant;

storing the position of the obstacle/element along with the severity degree associated therewith; and generating outputs to a user interface warning a driver approaching the obstacle/element about presence thereof; and/or generate outputs signaling the position of the obstacle/ element along with the severity degree associated therewith to a road managing company in charge of the road.

2. The method of claim 1, wherein the entry and exit time instants are identified by analyzing the acquired wheel speed values with respect to a sliding time window having a predefined time length.

3. The method of claim 2, wherein the predefined time length is selected from among predefined window time length values based on a current vehicle speed value indicative of a current speed of the motor vehicle.

4. The method of claim 3, wherein the current vehicle speed value is computed based on one or more of the acquired wheel speed values.

5. The method of claim 1, wherein computing a normalized peak-to- peak value related to the obstacle/element comprises:

forming an impact-related speed vector with the acquired wheel speed values related to the impact-related time instants;

forming an impact-free speed vector with the acquired wheel speed values related to the first impact-free time instants; and computing the normalized peak-to-peak value based on a maximum value and a minimum value of the wheel speed values in the impact-related speed vector, and an average value of the wheel speed values in the impact-free speed vector.

6. The method of claim 5, wherein the normalized peak-to-peak value is computed as a ratio of a difference between the maximum and minimum values of the wheel speed values in the impact-related speed vector to the average value of the wheel speed values in the impact-free speed vector.

7. The method of claim 1, wherein:

acquiring the wheel speed values comprises acquiring wheel speed values related to all the wheels of the motor vehicle;

wherein the method further comprises determining a travelling direction of the motor vehicle based on the acquired georeferencing data associated with one or more of the acquired wheel speed values related to the first impact-free time instants and to the second impact-free time instants; and the position of the detected obstacle/element is determined based on:

a vehicle position determined based on the acquired georeferencing data associated with one or more of the acquired wheel speed values related to the impact-related time instants;

a position on the motor vehicle of the wheel that has impacted the detected obstacle/element; and the determined travelling direction of the motor vehicle.

8. The method of claim 1, wherein the severity degree associated with the obstacle/element is determined based on the normalized peak-to-peak value and on an impact vehicle speed value indicative of a speed of the motor vehicle when impacting said obstacle/element.

9. The method of claim 8, wherein the impact vehicle speed value is obtained:

by acquiring the wheel speed values along with corresponding vehicle speed values of the motor vehicle and by computing said impact vehicle speed value based on one or more of the acquired vehicle speed values related to the first impact-free time instants; or by computing said impact vehicle speed value based on one or more of the acquired wheel speed values related to the first impact-free time instants.

10. The method of claim 8, further comprising estimating a first geometrical feature of the obstacle/element based on:

a time difference between the entry and exit time instants; and the average value of the acquired wheel speed values related to the first impact-free time instants, or the impact vehicle speed value.

11. The method of claim 8, further comprising estimating a second geometrical feature of the obstacle/element based on the normalized peak-to-peak value, the impact vehicle speed value and predefined reference data/thresholds.

12. The method of claim 11, wherein the predefined reference data/thresholds are preliminarily obtained by:

performing impact tests involving driving one or more motor vehicles at different vehicle speeds against/on different obstacles/elements with different, known geometrical features;

measuring/acquiring test-related wheel speeds and test-related vehicle speeds during the performed impact tests; and computing/determining, based on the test-related wheel speeds and the test-related vehicle speeds, reference data/thresholds to be used to estimate the second geometrical feature of the detected obstacle/element.

13. The method of claim 11, wherein the severity degree associated with the detected obstacle/element is determined also based on at least the predefined reference data/thresholds.

14. A system for detecting and locating obstacles/elements on road pavement, comprising:

an acquisition device installed on board a motor vehicle, and coupled to a vehicle bus of the motor vehicle, and configured to acquire wheel speed values related to a wheel of the motor vehicle when driven on a road, and georeferencing data associated with the wheel speed values and indicative of corresponding positions of the motor vehicle;

a processing system configured to:

detect an obstacle/element present on the road based on the acquired wheel speed values by:

identifying an entry time instant at which the wheel meets the obstacle/element, and an exit time instant at which the wheel has gone beyond said obstacle/element, and computing a normalized peak-to-peak value related to the obstacle/element based on:

a maximum value and a minimum value of the acquired wheel speed values related to impact-related time instants comprised between the entry and exit time instants; and an average value of the acquired wheel speed values related to first impact-free time instants immediately before the entry time instant;

determine a severity degree associated with the obstacle/element based on the normalized peak-to-peak value; and determine a position of the obstacle/element based on the acquired georeferencing data associated with one or more of the acquired wheel speed values related to the impact-related time instants and/or to the first impact-free time instants and/or to second impact-free time instants immediately after the exit time instant;

data storage configured to store the position of the obstacle/element along with the severity degree associated therewith and a notification system configured to warn a driver approaching the obstacle/element about presence thereof; and/or signal the position of the obstacle/element along with the severity degree associated therewith to a road managing company in charge of the road.

15. The system of claim 14, wherein:

the processing system comprises one or more processing devices installed on board the motor vehicle and connected to the acquisition device.

16. The system of claim 14, wherein:

the processing system comprises a cloud computing system remotely connected to the acquisition device.

17. A computer program product comprising a processing system having one or more software and/or firmware code portions loaded thereon, and configured for detecting and locating obstacles/elements on road pavement by directing the performance of operations comprising:

acquiring, from an acquisition device associated with a motor vehicle driven on a road, wheel speed values related to a wheel of the motor vehicle, and georeferencing data associated with the wheel speed values and indicative of corresponding positions of the motor vehicle;

detecting an obstacle/element present on the road based on the acquired wheel speed values by:

identifying an entry time instant at which the wheel meets the obstacle/element, and an exit time instant at which the wheel has gone beyond said obstacle/element, and computing a normalized peak-to-peak value related to the obstacle/element based on:

a maximum value and a minimum value of the acquired wheel speed values related to impact-related time instants comprised between the entry and exit time instants; and an average value of the acquired wheel speed values related to first impact-free time instants immediately before the entry time instant;

determining a severity degree associated with the obstacle/element based on the normalized peak-to-peak value;

determining a position of the obstacle/element based on the acquired georeferencing data associated with one or more of the acquired wheel speed values related to the impact-related time instants and/or to the first impact-free time instants and/or to second impact-free time instants immediately after the exit time instant; storing the position of the obstacle/element along with the severity degree associated therewith and generating outputs to a user interface warning a driver approaching the obstacle/element about presence thereof; and/or generating outputs signaling the position of the obstacle/element along with the severity degree associated therewith to a road managing company in charge of the road.

18. The computer program product of claim 17, wherein:

the processing system comprises one or more processing devices installed on board the motor vehicle and connected to the acquisition device.

19. The computer program product of claim 17, wherein:

the processing system comprises a cloud computing system remotely connected to the acquisition device.

* * * * *